United States Patent
Fazzio et al.

(10) Patent No.: US 11,268,891 B2
(45) Date of Patent: Mar. 8, 2022

(54) FIRE EXTINGUISHING AGENT CONCENTRATION MEASURING SYSTEM AND METHOD

(71) Applicant: Kidde Technologies, Inc., Wilson, NC (US)

(72) Inventors: Mark P. Fazzio, Wilson, NC (US); Harlan Hagge, Zebulon, NC (US); Qing Edda Liu, Wake Forest, NC (US); Eli Baldwin, Knightdale, NC (US); David William Frasure, Wilson, NC (US); Adam Chattaway, Old Windsor (GB); Jeffrey Angle, Knightdale, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/903,508

(22) Filed: Jun. 17, 2020

(65) Prior Publication Data

US 2021/0396641 A1    Dec. 23, 2021

(51) Int. Cl.
*G01N 15/06* (2006.01)
*A62C 37/00* (2006.01)
*G01N 15/00* (2006.01)

(52) U.S. Cl.
CPC ............ *G01N 15/06* (2013.01); *A62C 37/00* (2013.01); *G01N 2015/0053* (2013.01); *G01N 2015/0693* (2013.01)

(58) Field of Classification Search
CPC ...................................................... G01N 15/06

USPC ............................................................ 356/338
See application file for complete search history.

(56) References Cited

U.S. PATENT DOCUMENTS

| | | | |
|---|---|---|---|
| 3,628,028 A | 12/1971 | Thorshelm | |
| 4,434,655 A | 3/1984 | Summerfield et al. | |
| 6,833,028 B1* | 12/2004 | Scheer | H01L 21/67253 118/302 |
| 7,090,028 B2 | 8/2006 | Adiga | |
| 8,004,684 B2 | 8/2011 | Powell et al. | |
| 9,111,427 B2 | 8/2015 | Knox et al. | |
| 9,207,172 B2 | 12/2015 | Seebaluck et al. | |
| 10,267,723 B1* | 4/2019 | Saaski | G01N 15/1404 |
| 2009/0140168 A1* | 6/2009 | Goehde | G01N 15/1436 250/483.1 |
| 2014/0233017 A1 | 8/2014 | Hariram | |
| 2017/0306287 A1* | 10/2017 | Kawarai | C12M 47/02 |

OTHER PUBLICATIONS

Extended European Search Report for EP Application No. 21179845.9, dated Oct. 26, 2021, pp. 1-12.

* cited by examiner

Primary Examiner — Dominic J Bologna
Assistant Examiner — Omar H Nixon
(74) Attorney, Agent, or Firm — Cantor Colburn LLP

(57) ABSTRACT

A fire extinguishing agent concentration measuring system including a first window, a second window positioned relative to the first window thereby defining a sensing volume between the first window and the second window, a tube configured to port a flow including the agent from an environment through the sensing volume, and a fluid motion mechanism in operable communication with the tube configured to cause the flow through the tube and through the sensing volume.

14 Claims, 3 Drawing Sheets

FIRE EXTINGUISHING AGENT CONCENTRATION MEASURING SYSTEM AND METHOD

BACKGROUND

Fire extinguishing systems employ agents that are deployed to an environment to extinguish fire in the environment. Some conventional systems employ Halon, a liquefied, compressed gas that stops the spread of fire by chemically disrupting combustion. Halon is contributing to ozone depletion, so alternatives to Halon are being sought. Some alternatives include dry solid particulates that are dispersed within the environment. The distribution and concentration of the particulates within the environment is important to the effectiveness of the system. As such, systems and methods to test and/or monitor such concentrations are of interest.

BRIEF DESCRIPTION

Disclosed herein is a fire extinguishing agent concentration measuring system. The system includes a first window, a second window positioned relative to the first window thereby defining a sensing volume between the first window and the second window, a tube configured to port a flow including the agent from an environment through the sensing volume. The system further including a fluid motion mechanism in operable communication with the tube configured to cause the flow through the tube and through the sensing volume.

Also disclosed herein is a method of measuring a fire extinguishing agent within an environment. The method includes moving fluid containing the fire extinguishing agent from the environment through a tube, passing the fluid through a sensing volume defined in part by a first window and a second window, detecting light passing through the sensing volume, and determining a concentration of the fire extinguishing agent present in the fluid.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 2:
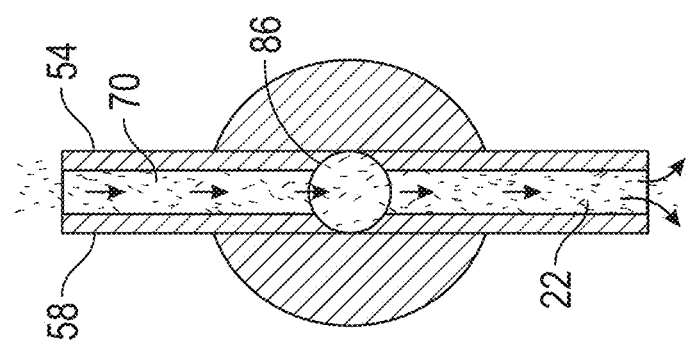
FIG. 2 depicts an alternate cross-sectional view of the embodiment of FIG. 1.
Figure 1:
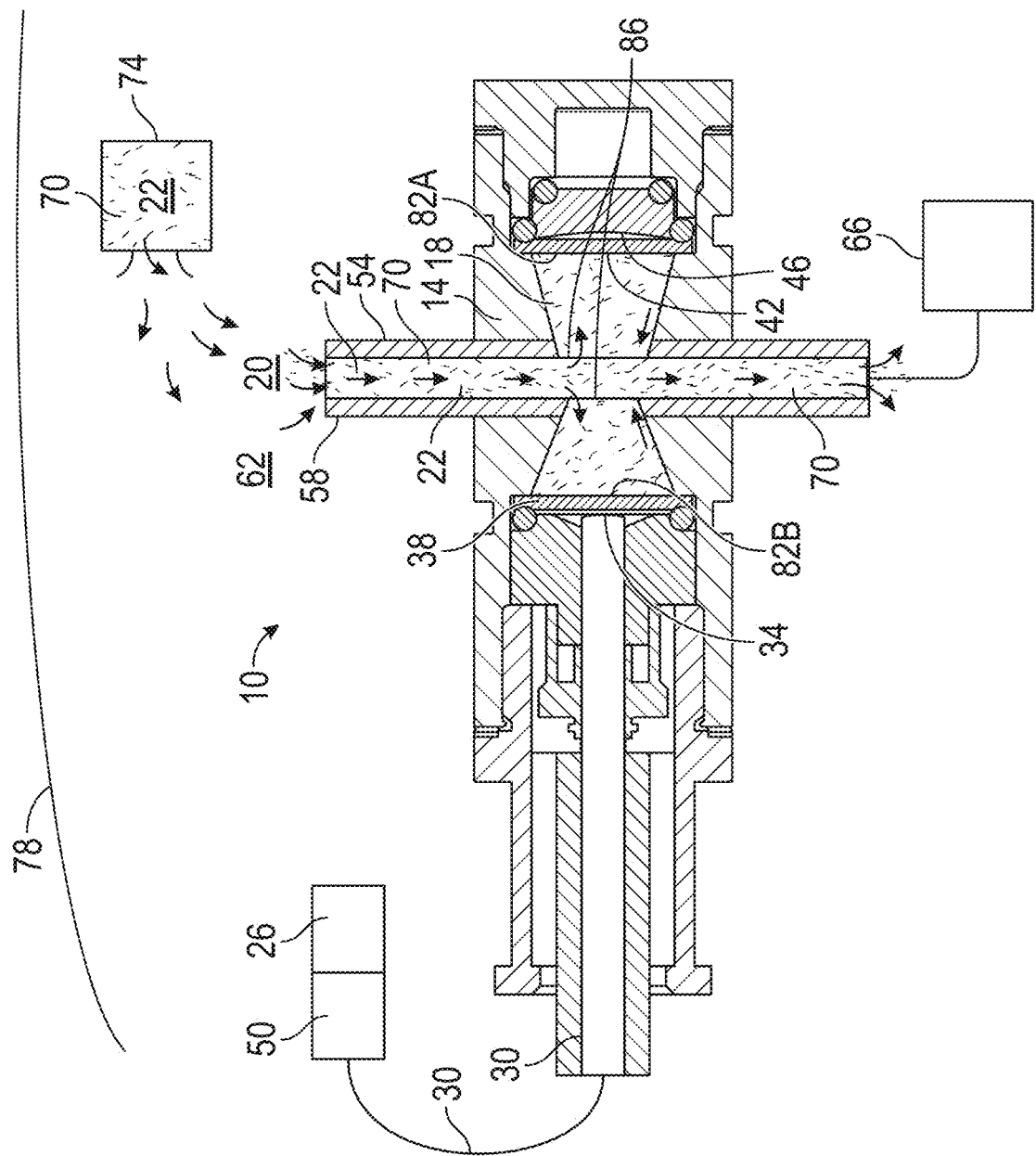
FIG. 1 depicts a cross-sectional view of an embodiment of a fire extinguishing agent concentration measuring system disclosed herein.

FIGS. 1 and 2 depict a fire extinguishing agent concentration measuring system disclosed herein identified by reference character 10. The system 10, in one embodiment includes, a housing 14 defining a cavity 18, also referred to herein as a sensing volume, through which a fluid 20 (the fluid 20 containing a fire extinguishing agent 22) passes. Light is provided from a light source 26 through an optical fiber 30. The light is transmitted from an end 34 of the optical fiber 30 through a window or lens 38, then through the cavity 18, through another window 42 and impinges on a mirror 46. Light reflected from the mirror 46 travels in reverse back to a sensor 50 located near the light source 26. The sensor 50 is calibrated to detect light received and correlate it to a concentration of the agent 22 present in the fluid 20 based on scatter of the light caused by the presence of the agent 22. While the embodiments illustrated in the figures herein include items such as, the housing 14, the mirror 46, and the optical fiber 30, alternate embodiments are contemplated that don't require these specific items.

A tube 54 is fluidically connected to the cavity 18. At least one end 58 of the tube 54 is in fluidic communication with an environment 62 that contains the fluid 20 with the agent 22. A fluid motion mechanism 66, such as a pump or a vacuum source, for example, is connected to the tube 54 to cause the fluid 20 to flow through the tube 54 and thus also through the cavity 18.

The agent 22 may consist of solid particulates 70 that are emitted from a container 74 configured to hold the agent 22 until dispersion of the agent 22 is needed such as in the event of a fire, for example. The container 74 may be positioned within the environment 62 which may be housed within a turbine engine 78 or other system wherein quick extinguishment of a fire is desired.

Since an amount of light received by the sensor 50 can in part be used to determine the concentration of the agent 22, anything that changes over time to increase obstruction of transmission of the light can cause error in the accuracy of the measurement being made. One such possible obstruction is the cleanliness of surfaces 82A and 82B of the windows 38, 42 respectively. One such example, is due to some of the solid particulates 70 of the agent 22 becoming attached, such as by plating, to the surfaces 82A, 82B. The system 10 and methods disclosed herein are configured to reduce such plating.

The fluid motion mechanism 66 and the tube 54 are specifically configured to draw the fluid 20 through the cavity 18 in a way such that plating of the agent 22 on the surfaces 82A, 82B is discouraged. This can be in part due to flow rates of the fluid 20 through the tube 54 and through the cavity 18.

Figure 4:
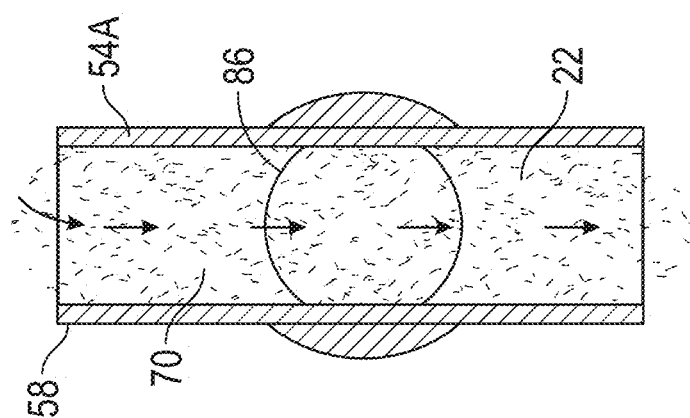
FIG. 4 depicts an alternate cross-sectional view of the embodiment of FIG. 3.
Figure 3:
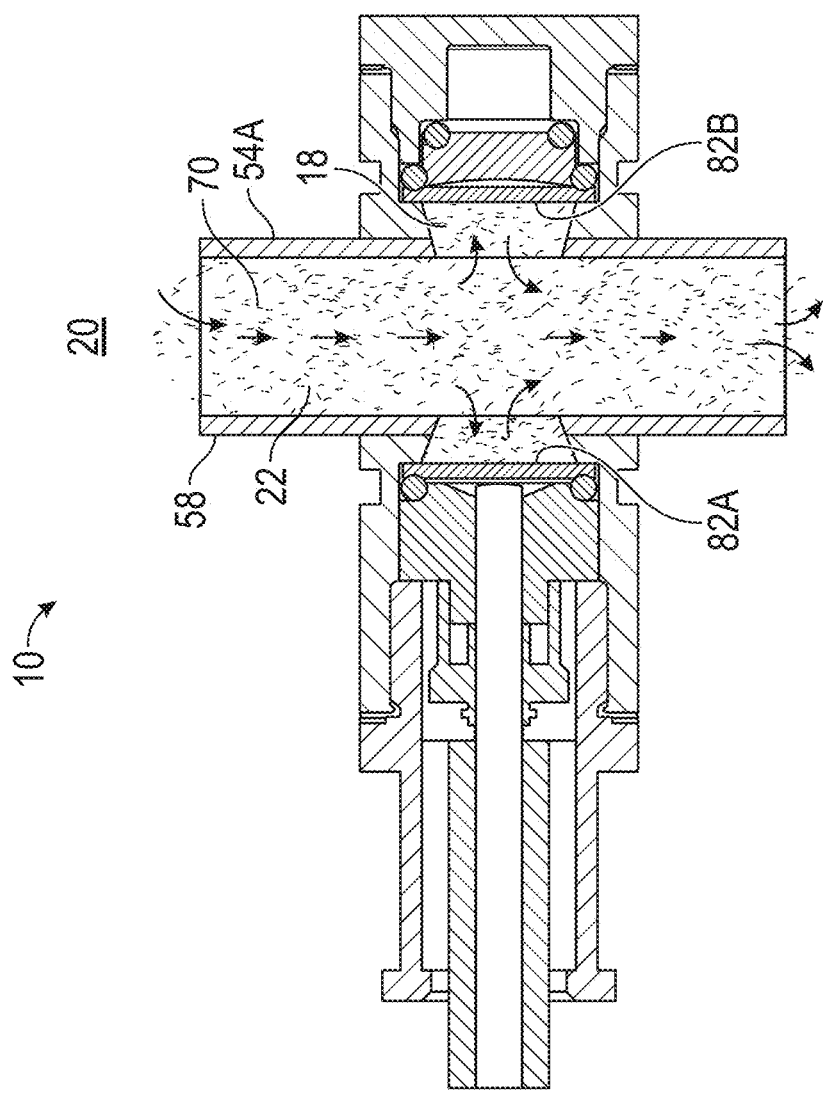
FIG. 3 depicts a cross-sectional view of a portion of another embodiment of a fire extinguishing agent concentration measuring system disclosed herein.

Referring to FIGS. 3 and 4, an alternate embodiment of a portion of an agent concentration measuring system disclosed herein is illustrated. A size of tube 54A is larger than that of the tube 54 in the embodiment of FIGS. 1 and 2.

Figure 7:
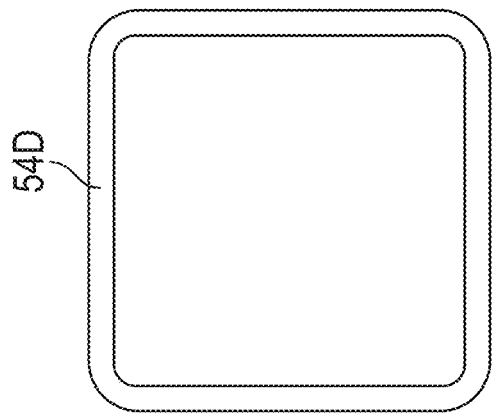
FIG. 7 depicts a cross-sectional view of a polygonal shaped tube employed in yet another embodiment of an agent concentration measuring system disclosed herein.
Figure 6:
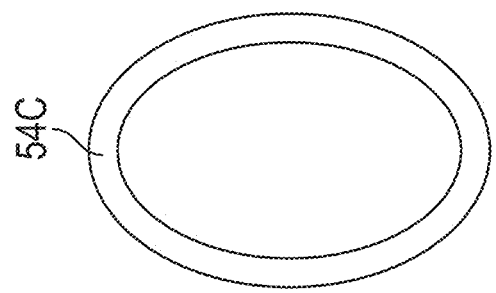
FIG. 6 depicts a cross-sectional view of an oval shaped tube employed in an alternate embodiment of an agent concentration measuring system disclosed herein.
Figure 5:
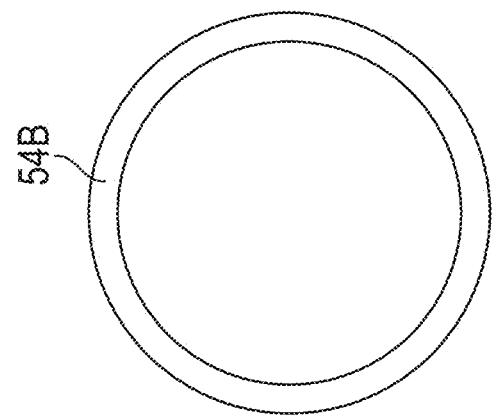
FIG. 5 depicts a cross-sectional view of a round shaped tube employed in an embodiment of an agent concentration measuring system disclosed herein.

Referring to FIGS. 5, 6 and 7, cross-sectional shapes of tubes 54B, 54C and 54D respectively, are altered to also help reduce any plating. The cross-sectional shape may by circular as shown in FIG. 5, oval as shown in FIG. 6, or polygonal as shown by the rectangular shape in FIG. 7.

The tube 54 includes an opening 86 that extends fully through the tube 54 that allows the fluid 20 flowing through the tube 54 to flow into and out of the cavity 18. The openings 86, the tube 54 and the cavity are configured to cause the fluid flow to be of a type (e.g., laminar or turbulent) that tends to decrease plating of the agent on the surfaces 82A and 82B. The configuration that is needed to result in a particular type of fluid flow may be determined empirically or through modelling such as via computational fluid dynamics modelling, for example.

The windows 38, 42 are positioned and configured within the system 10 so that they can be easily cleaned. This allows the system 10 to be deployed during a test dump of the fluid 20 from the container 74 to measure the concentration of the agent 22. After which, the windows can be cleaned in preparation of another test.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire extinguishing agent concentration measuring system comprising:
   a first window;
   a second window positioned relative to the first window thereby defining a sensing volume within a housing between the first window and the second window;
   a tube passing through the sensing volume within the housing between the first window and the second window and configured to port a flow including the agent from an environment through the sensing volume, wherein the tube includes openings to provide fluidic communication between the tube and the sensing volume; and
   a fluid motion mechanism in operable communication with the tube configured to cause the flow through the tube and through the sensing volume.

2. The fire extinguishing agent concentration system of claim 1, wherein the fluid motion mechanism is a pump.

3. The fire extinguishing agent concentration system of claim 1, wherein the fluid motion mechanism is a vacuum source.

4. The fire extinguishing agent concentration system of claim 1, wherein flow through the tube is laminar.

5. The fire extinguishing agent concentration system of claim 1, wherein flow through the tube is turbulent.

6. The fire extinguishing agent concentration system of claim 1, wherein the agent includes dry solid particulates.

7. The fire extinguishing agent concentration system of claim 1, wherein a cross-sectional shape of the tube is one of circular, oval, and polygonal.

8. The fire extinguishing agent concentration system of claim 1, further comprising a sensor in operable communication with the sensing volume configured to determine a concentration of the agent based on an amount of light scattered by the agent as light travels through the sensing volume.

9. A method of measuring a fire extinguishing agent within an environment, comprising:
   moving fluid containing the fire extinguishing agent from the environment through a tube;
   passing the fluid through a sensing volume within a housing via the tube, the sensing volume defined in part by a first window and a second window by flowing the fluid through openings in the tube into the sensing volume;
   detecting light passing through the sensing volume; and
   determining a concentration of the fire extinguishing agent present in the fluid.

10. The method of measuring a fire extinguishing agent within an environment of claim 9, wherein the moving fluid is via pumping.

11. The method of measuring a fire extinguishing agent within an environment of claim 9, wherein moving the fluid is via drawing it with a vacuum source.

12. The method of measuring a fire extinguishing agent within an environment of claim 9, further comprising transmitting light through the first window, through the sensing volume and through the second window.

13. The method of measuring a fire extinguishing agent within an environment of claim 9, further comprising flowing the fluid in laminar fashion through the sensing volume.

14. The method of measuring a fire extinguishing agent within an environment of claim 9, further comprising flowing the fluid in turbulent fashion through the sensing volume.

* * * * *